(Model.)
3 Sheets—Sheet 3.
A. JOHNSTON.
Metal Screw Machine.
No. 241,806.     Patented May 24, 1881.
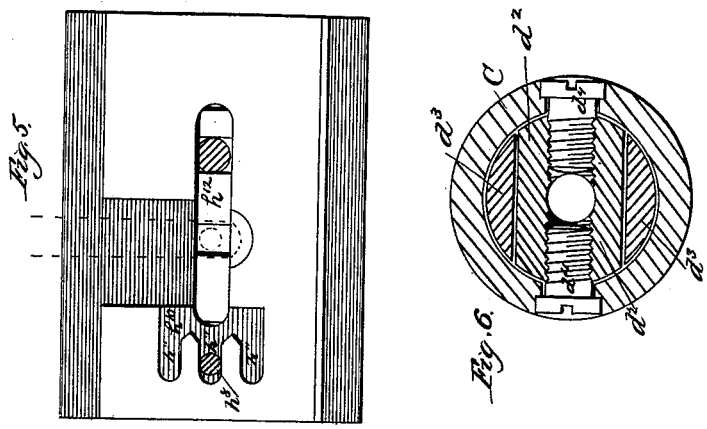
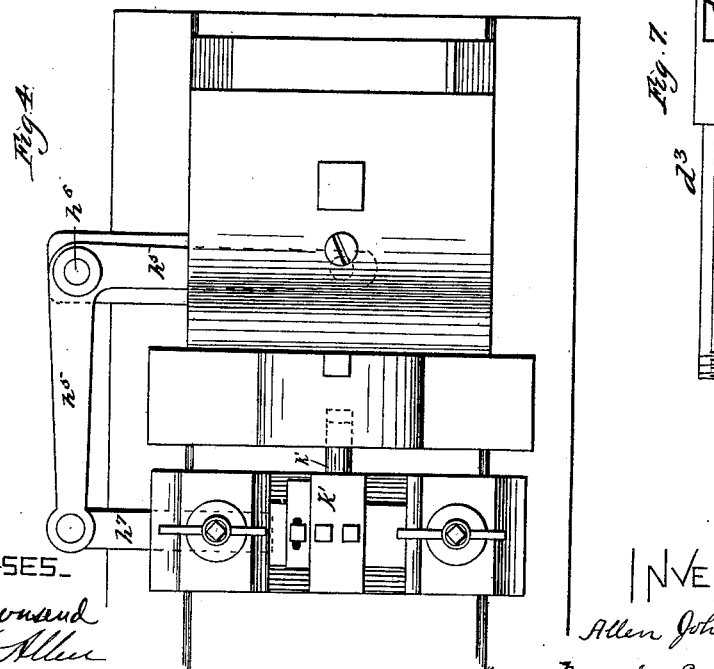

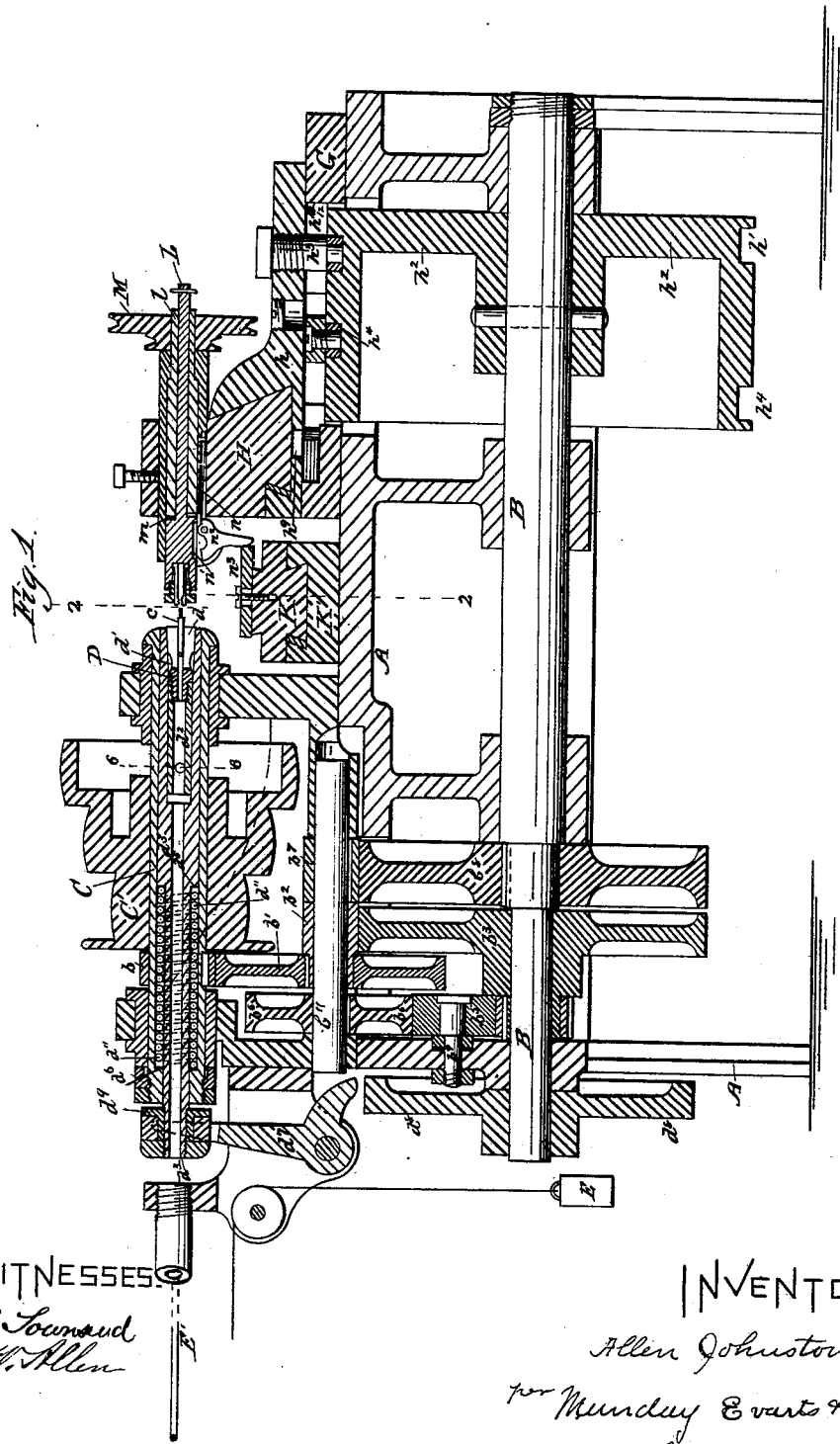

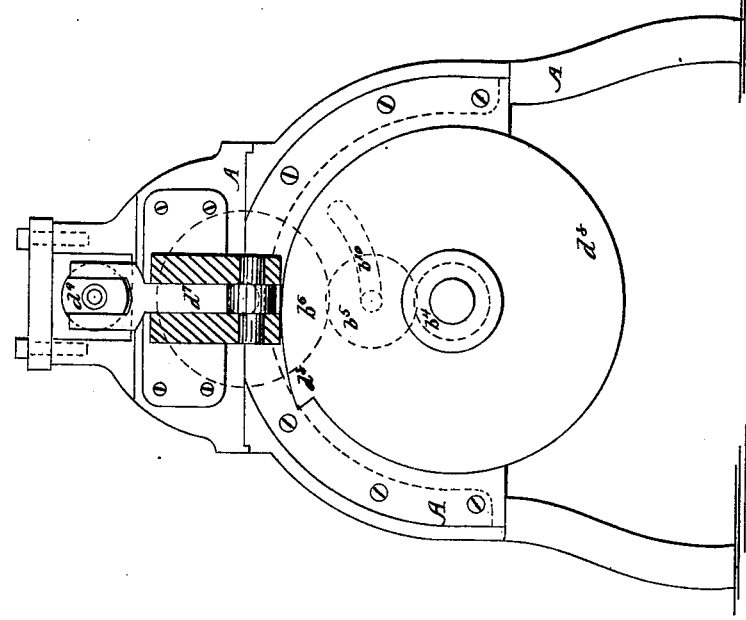

UNITED STATES PATENT OFFICE.

ALLEN JOHNSTON, OF OTTUMWA, IOWA.

METAL-SCREW MACHINE.

SPECIFICATION forming part of Letters Patent No. 241,806, dated May 24, 1881.

Application filed November 12, 1880. (Model.)

*To all whom it may concern:*

Be it known that I, ALLEN JOHNSTON, of Ottumwa, in the county of Wapello and State of Iowa, have invented certain new and useful Improvements in Metal-Screw Machines, of which the following is a specification.

My invention relates to automatic machines for forming screws from the end of a rod.

Heretofore in such machines the thread-cutting die, as well as the turning-down tool, cutting-off tool, and other tools, has been held stationary or non-revolving while doing its work, it being simply advanced in turn, like the other tools, to operate upon the rod, which is made to revolve with the chuck. As the die is comparatively a fine and delicate tool, and as it must necessarily advance on the rod the distance between two consecutive threads at each revolution of the chuck, only a limited speed can be given the chuck without creating so much resistance on the die as to injure it; but when the other tools are doing their work the chuck may be revolved at a much higher rate without injury to the tools.

The object of my invention is to provide a screw-machine wherein the chuck may be revolved at such high rate of speed as is required, in order to be most effective for the operation of the turning-down and the cutting-off tools, but in which the die will thread the screw only at such rate as will be most effective to do its work, so that the entire machine may be run to its full capacity. This I accomplish by giving the die, instead of holding it stationary, as heretofore, when the thread is being cut, a revolution in the same direction with the chuck, but at a different speed, so that though the chuck may be revolving very rapidly the rate at which the die will thread the screw will only be the difference between the rates of revolution of the chuck and the die. This may be done by revolving the die and chuck in either direction. If they are revolved in the direction necessary to cause the die to thread the screw if the chuck were stationary, the die must be made to revolve faster than the chuck; if in the opposite direction, the die must be made to revolve slower than the chuck. And my invention consists, in combination with a revolving chuck, of a thread-cutting die mounted on a revolving spindle, in connection with mechanism whereby the spindle, at the time the die is cutting the thread, is revolved in the same direction as the chuck, but at a different rate. It also consists in the novel devices and combinations of devices hereinafter described.

In the accompanying drawings, which form a part of this specification, Figure 1 is a central vertical longitudinal section of my improved machine. Fig. 2 is a transverse section on line 2 of Fig. 1. Fig. 3 is an end view. Fig. 4 is a detail plan of the rear end of the machine with tools removed. Fig. 5 is a detail plan of the bed-piece. Fig. 6 is a section of the spindle and chuck on line 6 of Fig. 1, and Fig. 7 is a detail plan view of a tube inside the chuck-spindle.

Similar letters of reference indicate like parts wherever used.

In said drawings, A represents the frame of the machine, and B is the main shaft, upon which the cams for imparting motion to the different parts of the machine are mounted. The shaft B derives its motion from the chuck-spindle C through the intermediate gears $b$, $b'$, $b^2$, $b^3$, $b^4$, $b^5$, $b^6$, $b^7$, and $b^8$. The gear or idler $b^5$ is mounted on a shaft, $b^9$, adjustable in the arc-limb $b^{10}$, so that gears of different sizes may be substituted for the gear $b^4$ for the purpose of changing the speed. The gears $b^6$ and $b^7$ are keyed to the shaft $b^{11}$, the gear $b^8$ to the main shaft, and the gear $b$ to the chuck-spindle, while the gears $b'$ and $b^2$ are secured together and turn loosely on the shaft $b^4$, and the gears $b^3$ and $b^5$ are similarly arranged on the main shaft.

C' is the drive-pulley for the chuck-spindle, and $c$ is the stock or rod from the end of which the screws are formed. It is grasped by the chuck and made to revolve with it.

$d$ are the jaws of the chuck, formed by splitting the hollow conical tube D back a portion of its length into four parts, more or less, and being hollowed out at $d'$ to give the necessary spring to the jaws. The tube D is secured to the end of the hollow block $d^2$, which fits in a mortise, $d^{10}$, in the tube $d^3$. The block $d^2$ is secured to the chuck-spindle by means of the screw-bolts $d^4$. The end of the tube $d^3$ is provided with a conical interior to correspond to the conical exterior of the chuck-jaws, and is split in two parts back to the mortise in which the block $d^2$ works, so that the spring of the two parts of the tube causes them always to perfectly fill or fit against the interior of the spindle, and thus perfectly center the chuck and the rod or stock, though the same may become worn and fit very loosely in the spindle. The tube $d^3$ is pressed forward, so as to tighten the jaws of the chuck upon the stock, by means of the spiral spring $d^{11}$, surrounding the tube $d^3$, and fitting against a shoulder, $d^5$, on said tube, and a similar shoulder, $d^6$, on the interior of the spindle. The tube $d^3$ is retracted, so as to relieve the stock from the pressure of the chuck-jaws and permit the same to be fed forward, by means of the weight E, actuating the following rod $E'$, by means of the forked bent lever $d^7$, actuated by the cam $d^8$, which is keyed to the main shaft. Other ordinary devices for feeding the rod forward may be used. The fork of the lever $d^7$ fits in a collar, $d^9$, on the end of the tube $d^3$.

Other equivalent devices may be employed for retracting the chuck-spring than the lever $d^7$ and cam $d^8$; and if the lever is employed it may be actuated by other equivalent devices than the cam. I however prefer to use the means shown for retracting the spring, as I consider the same to be the best method of practicing my invention.

The various screw-forming tools, including the thread-cutting die, are mounted in a sliding tool-holder, H, which may be shifted laterally, so as to present the different tools, in turn, to the end of the rod, in the longitudinal slide $h$. The slide $h$ is moved back and forth, so as to cause the several tools to operate upon the revolving rod, and to withdraw the same from the work by means of the cam $h'$, cut in the cylindrical cam-wheel $h^2$, and the pin $h^3$, secured to the said slide, which works back and forth in a groove, $h^{12}$, in the bed-piece G.

K is a slide which moves laterally in the bed-piece $K'$, secured to the main frame, and $k\ k$ are cutting-off and shaping tools mounted on this slide. The slide K is moved laterally by means of the cam $h^4$, which actuates the bell-crank lever $h^5$, pivoted at $h^6$ to the frame, thus driving the rod $h^7$, which is connected with the slide K.

$k'$ is a pin or stud bolted to the slide K and extending into a hole in the tool-holder H, so that the lateral motion of the slide is communicated to the tool-holder. The pin $k'$ is of such length that the tool-holder will not become disengaged therefrom by reason of its longitudinal motion.

$h^8$ is a pin secured to the tool-holder and extending down through a transverse slot, $h^9$, in the slide $h$, into a recessed groove or cam, $h^{10}$, having as many prongs $h^{11}$ as there are tools mounted on the tool-holder, for the purpose of centering the tools with the stock and steadying the tools during their operation. The form of the cam $h^4$ is such as to shift the tool-holder laterally at the times when the cam $h'$ has withdrawn the tool-holder, so that the pin $h^8$ is retracted out of the prongs $h^{11}$ of the groove $h^{10}$, the cam $h^4$ also presenting and withdrawing the tools mounted on the slide K to and from the work.

L is the spindle in which the thread-cutting die is secured, and which turns freely in the sleeve $l$ when not held by the clutches.

M is the pulley secured to the end of the sleeve $l$ for the purpose of driving the die-spindle in the same direction, but at a faster speed. The actuating-pulley should be mounted directly over the pulley M, so that when the tool-holder is shifted laterally the belt will not be too much slackened. The die-spindle may be driven from the chuck-spindle by means of connecting-gears, or still other means may be employed, if desired. I prefer, however, the means shown. When the tool-holder is advanced to present the die to the work the clutch $m$ on the die-spindle and sleeve $l$ causes the spindle to revolve with the sleeve. After the thread is cut and the tool-holder has receded so as to disengage the clutch $m$, and thus permit the die to revolve with the chuck, and at the same rate, the spring $n$ causes the clutch $n'\ n^2$ to arrest the revolution of the die, and thus unthread itself from the screw. The shoulder on the part $n'$ is so located that it cannot engage with the part $n^2$ to arrest the revolution of the spindle until the tool-holder has been withdrawn sufficiently to disengage the parts of the clutch $m$. $n^3$ is a bar or projection secured to the slide K, which strikes against the leg of the part $n^2$ when the tool-holder is advanced to cut the thread, and thus keeps the clutch $n'\ n^2$ open or disengaged at that time. The part $n^2$ of the clutch $n'\ n^2$ is pivoted to a projection on the sleeve $l$; but the two parts of the clutch are adapted to permit the die-spindle to slide longitudinally in the sleeve without disengaging this clutch, so that the tool-holder to which the sleeve is secured may be withdrawn independent of the die-spindle while the die is being unthreaded from the screw, thus obviating the necessity of any nice adjustment of the backward motion of the tool-holder to the rate at which the die is caused to recede from the screw when being unthreaded, and removing all danger of jamming or injuring the threads of the screw for lack of such adjustment.

The die-spindle may be mounted on other kinds of tool-holders than the sliding tool-holder described, and I do not wish to limit myself to a sliding tool-holder.

The operation of my invention can be clearly understood by those skilled in the art from the preceding description and the drawings. The size of the pulley which drives the die-spindle is such that the spindle will make about four revolutions while the chuck makes three; but this proportion may be varied, depending upon the material of which the screw is being made and the fineness of the threads. If the die-spindle and chuck are revolved in the opposite direction from that necessary to thread the screw if the chuck were stationary, it must be revolved at a slower rate than the chuck, and somewhat different mechanism in that case is employed from that described to unthread the die from the screw—namely, by reversing the chuck—or still other means may be employed. I prefer, however, the method described of practicing my invention.

The sliding tool-holder mounted on the longitudinal slide, in connection with automatic mechanism for actuating the same, together with the thread-cutting die mounted on a die-spindle adapted to be withdrawn from the work independent of the retracting motion of the tool-holder, do not constitute part of this application, as these features I have made the subject-matter of a previous application for a patent for metal-screw machines, which was filed in the United States Patent Office October 22, 1880, and I hereby disclaim any intention to claim herein any part of my invention claimed in such previous application, to which, for greater certainty herein, I would beg leave to refer.

What I claim is—

1. The combination of a revolving chuck with a thread-cutting die mounted on a revolving spindle, and mechanism for giving said spindle at the time the thread is being cut a revolution in the same direction as the chuck, but at a different speed, substantially as described.

2. As a means for forming screws from the end of a rod, the combination of a revolving chuck with a thread-cutting die mounted on a die-spindle revolving at the time the thread is being cut in the same direction as the chuck, but at a different rate of speed, and a clutch for holding the die-spindle for the purpose of unthreading the die from the screw, substantially as specified.

3. The combination of the die-spindle and a revolving sleeve with the clutches $m$ and $n'$ $n^2$ and a bar or projection secured to the slide K, for the purpose of preventing said clutches acting simultaneously or against each other, substantially as described.

4. The combination of the sliding tool-holder, mounted on a longitudinal slide, with the lateral slide K, mounted on a stationary bed-piece, connecting-pin, and mechanism for imparting to slide K its lateral motions, substantially as specified.

5. The combination of the sliding tool-holder, mounted in a longitudinal slide, provided with a pin which fits and works in a groove in the bed-piece, with the slide K, adapted to carry turning and cutting-off tools, and the lever and cams for imparting to the tool-holder its lateral and longitudinal motions.

6. The combination of the hollow chuck-spindle, provided with an interior shoulder, with the sliding tube provided with a split conical end, an exterior shoulder, spring surrounding said tube, and lever and cam for retracting said spring, substantially as specified.

7. The combination of the sliding tube, provided with a mortise and a split conical end interiorly, with the tube D, provided with chuck-jaws, and the hollow block fitting in said mortise and secured to the chuck-spindle, substantially as described.

8. The combination of the sliding tube provided with split end, conical interiorly, cam, forked lever, spring surrounding the said tube, chuck-spindle, hollow block secured to the spindle, and the chuck-jaws, substantially as specified.

9. The combination of the series of intermediate gears, arranged and operating substantially as shown, with the idler $b^5$, mounted on a shaft adjustable in an arc-limb, substantially as specified.

10. In a chuck, the chuck-spring placed inside the chuck-spindle and surrounding the tube which actuates the chuck-jaws, in combination with a lever adapted to automatically retract said spring, substantially as specified.

ALLEN JOHNSTON.

Witnesses:
 EDMUND ADCOCK,
 EDW. S. EVARTS.